United States Patent
Frolov

(10) Patent No.: US 10,046,476 B2
(45) Date of Patent: Aug. 14, 2018

(54) TABLE SAW RIVING KNIFE MOUNTING ARRANGEMENT

(71) Applicant: Andrew Frolov, Glenview, IL (US)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 180 days.

(21) Appl. No.: 14/848,434

(22) Filed: Sep. 9, 2015

(65) Prior Publication Data

US 2016/0067880 A1 Mar. 10, 2016

Related U.S. Application Data

(60) Provisional application No. 62/047,979, filed on Sep. 9, 2014.

(51) Int. Cl.
*B27G 19/02* (2006.01)
*B27G 19/08* (2006.01)
*B23D 45/06* (2006.01)

(52) U.S. Cl.
CPC .............. *B27G 19/02* (2013.01); *B27G 19/08* (2013.01); *B23D 45/061* (2013.01)

(58) Field of Classification Search
CPC ......... B27G 19/08; B27G 19/02; B23D 45/06
See application file for complete search history.

(56) References Cited

U.S. PATENT DOCUMENTS

| | | | |
|---|---|---|---|
| 5,022,577 A * | 6/1991 | Fike | A47F 7/17 225/39 |
| 7,475,622 B1 * | 1/2009 | Chang | B27G 19/02 83/477.2 |

(Continued)

FOREIGN PATENT DOCUMENTS

| | | | |
|---|---|---|---|
| CN | 201483580 U | * | 5/2010 |
| CN | 101745692 A | | 6/2010 |

(Continued)

OTHER PUBLICATIONS

English Translation of CN101745692.*

(Continued)

*Primary Examiner* — Jennifer Swinney
(74) *Attorney, Agent, or Firm* — Maginot Moore & Beck LLP

(57) ABSTRACT

A riving knife mounting assembly rigidly and accurately positions the riving knife relative to the cutting blade by way of a simple and intuitive mechanism. Interaction between a clamping plate and a locking plate engage opposite sides of the riving knife to hold the riving knife in place, and provides a sensible indication that the two components are properly mated. A cam lever assembly allows loosening or tightening the clamping plate and locking plate together about the riving knife by simply rotation of the lever. A spring assembly maintains pressure on the riving knife even in the loosened position to maintain proper positioning of the components. The clamping plate is part of a mounting bracket that is mounted to a motor arm movable with the drive assembly, and includes adjustment screws for adjusting the orientation of the riving knife relative to the cutting blade in multiple degrees of freedom.

20 Claims, 16 Drawing Sheets

(56) References Cited

U.S. PATENT DOCUMENTS

| | | | | |
|---|---|---|---|---|
| 7,814,818 B2* | 10/2010 | Domeny | ................ | B27G 19/02 83/102.1 |
| 7,827,890 B2* | 11/2010 | Gass | .................... | B23D 45/067 83/102.1 |
| 8,096,220 B2* | 1/2012 | Weir | ...................... | B27G 19/02 83/477.2 |
| 2004/0011177 A1* | 1/2004 | Huang | .................. | B27G 19/02 83/478 |
| 2007/0074612 A1 | 4/2007 | Yu | | |
| 2007/0095185 A1 | 5/2007 | Chang | | |
| 2008/0022820 A1 | 1/2008 | Merhar et al. | | |
| 2008/0276780 A1* | 11/2008 | Chuang | .................. | B23D 47/02 83/508 |
| 2009/0145275 A1* | 6/2009 | Chuang | .................. | B27G 19/08 83/102 |
| 2009/0288303 A1* | 11/2009 | Liao | ........................ | B26D 7/00 30/293 |
| 2010/0101388 A1* | 4/2010 | Chen | ...................... | B27G 19/02 83/102.1 |
| 2010/0126324 A1 | 5/2010 | Liu et al. | | |
| 2011/0048199 A1* | 3/2011 | Voruganti | ............. | B27G 19/02 83/102.1 |
| 2011/0126682 A1 | 6/2011 | Gass et al. | | |
| 2011/0154966 A1 | 6/2011 | Chen et al. | | |
| 2011/0167976 A1 | 7/2011 | Liu | | |
| 2011/0182658 A1* | 7/2011 | Lindloff | ..................... | B62J 1/28 403/316 |
| 2011/0259165 A1 | 10/2011 | Chiang et al. | | |

FOREIGN PATENT DOCUMENTS

| | | | | |
|---|---|---|---|---|
| CN | 102233459 A | * | 11/2011 | |
| DE | 10347915 B3 | | 12/2004 | |
| EP | 1616681 A1 | * | 1/2006 | ............. B27B 5/165 |

OTHER PUBLICATIONS

English Translation of DE10347915.*
International Search Report and Written Opinion corresponding to PCT Application No. PCT/US2015/049134, dated Dec. 18, 2015 (23 pages).

* cited by examiner

TABLE SAW RIVING KNIFE MOUNTING ARRANGEMENT

REFERENCE TO RELATED APPLICATION AND PRIORITY CLAIM

This application is a utility filing from and claims priority to provisional application No. 62/047,979, filed on Sep. 9, 2014, the entire disclosure of which is incorporated herein by reference.

BACKGROUND

The disclosure relates to power tools and particularly to power tools integrated into a table that provides a work surface for supporting the workpiece, such as power table saws.

A number of power tools have been produced to facilitate forming a work piece into a desired shape. One such power tool is a table saw. A wide range of table saws are available for a variety of uses. Some table saws, such a cabinet table saws, are very heavy and relatively immobile. Other table saws, sometimes referred to as jobsite table saws, are relatively light and portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a riving knife which functions to restrain the workpiece from kickback. If the riving knife is poorly or loosely adjusted its function is compromised. Typical riving knives exhibit excessive play when in the unlocked position which hampers the ability of the operator to readily and securely fix the riving knife in its locked position. Another difficulty encountered by operators using a table saw arises in mounting and adjusting the riving knife. There is thus a need for a riving knife mounting arrangement that is intuitive to the operator and that allows the component to be easily and accurately engaged to the power tool.

SUMMARY

A mounting assembly for mounting a riving knife of a table saw to a motor arm of the table saw comprises a mounting bracket mountable to the motor arm of the table saw, the mounting bracket including a clamping plate defining a clamping surface facing the riving knife and a locking plate defining a locking surface facing the riving knife and the clamping plate, for clamping the riving knife therebetween. A tab and recess arrangement is defined between the mounting bracket and the locking plate, in which the tab is sized to extend through the arcuate slot of the riving knife and the recess is sized to receive the tab when the tab extends through the arcuate slot. The tab and recess arrangement maintains the clamping plate, locking plate and riving knife in a proper position even as the angular orientation of the riving knife is adjusted.

The mounting assembly further comprises a lever assembly engaged between the mounting bracket and locking plate that is operable to press the mounting bracket and locking plate together about the riving knife to clamp the riving knife between the clamping surface and the locking surface In one aspect, the lever assembly includes an elongated locking shaft extending through shaft openings in the mounting bracket and the locking plate, the locking shaft configured to extend through the arcuate slot in the riving knife. One end of the locking shaft is fastened to the clamping plate while the opposite end of the locking shaft includes a lever hub rotatably mounted thereon. The lever hub includes a manually engagable lever for rotating the lever hub relative to the locking shaft. A spring arrangement is mounted on the locking shaft between the lever hub and the locking plate. In one aspect, the lever assembly includes a cam arrangement between the locking shaft and the lever hub operable to pull the locking shaft toward the lever hub upon rotation of the lever hub, to thereby pull the clamping plate toward the locking plate against the force of the spring arrangement to thereby clamp the riving knife between the clamping surface and locking surface.

In one aspect, the spring arrangement can include two bevel washers opposing each other. In a further aspect, the lever hub defines a bore therethrough and an arcuate cam slot in communication with the bore, and the locking shaft includes a shaft hub at the opposite end of the shaft that is received within the bore of the lever hub to permit rotation of the lever hub relative to the shaft hub. The shaft hub includes a pin projecting from the shaft hub and into the arcuate cam slot, with the cam slot configured to move the pin toward or away from the clamping plate upon rotation of the lever hub.

In another feature, one of the clamping plate and the locking plate includes a pair of bosses corresponding to a pair of openings in the riving knife that flank the arcuate slot. The other of the clamping plate and the locking plate includes a pair of openings to receive the pair of bosses passing through the pair of openings in the riving knife but only when the riving knife is clamped between the clamping plate and locking plate. A shoulder screw may be provided that extends through the locking plate and through the arcuate slot in the riving knife, and fastened to the clamping plate at a position below the elongated locking shaft relative to the length of the riving knife. A spring disposed between the head of the shoulder screw and the locking plate applies a spring force between the clamping plate and locking plate that is insufficient to clamp the riving knife between the clamping plate and the locking plate. However, the spring force is sufficient to push the pair of bosses into the matched pairs of openings when in alignment.

The locking shaft includes a keyed portion extending through the shaft opening in the clamping plate and the shaft opening of the clamping plate is complementary configured to the keyed portion to prevent rotation of the locking shaft relative to the clamping plate.

The mounting bracket includes a mounting plate defining at least one fastener opening to receive a fastener for engaging the motor arm of the table saw. The mounting plate may further include at least one adjustment screw extending through a threaded adjustment opening in the mounting plate and arranged to bear on the motor arm when the mounting plate is engaged to the motor arm to adjust the position of the mounting bracket relative to the motor arm.

DETAILED DESCRIPTION

Figure 1:
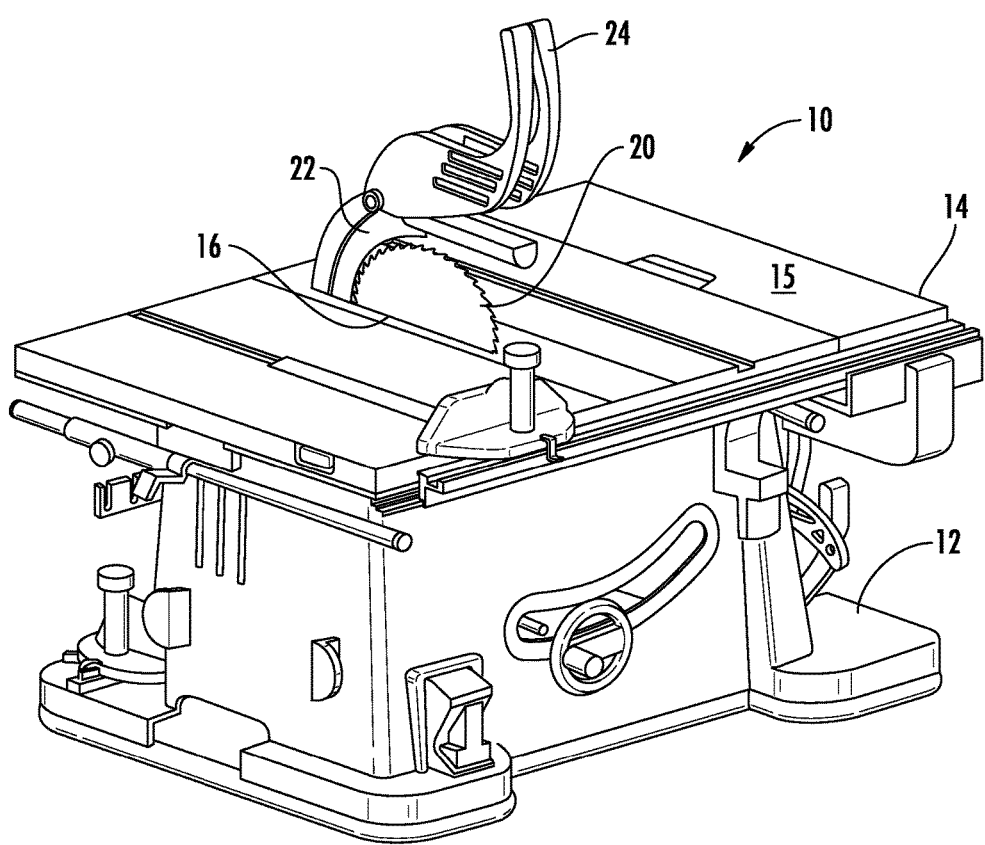
FIG. 1 is a perspective view of a table saw according to the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
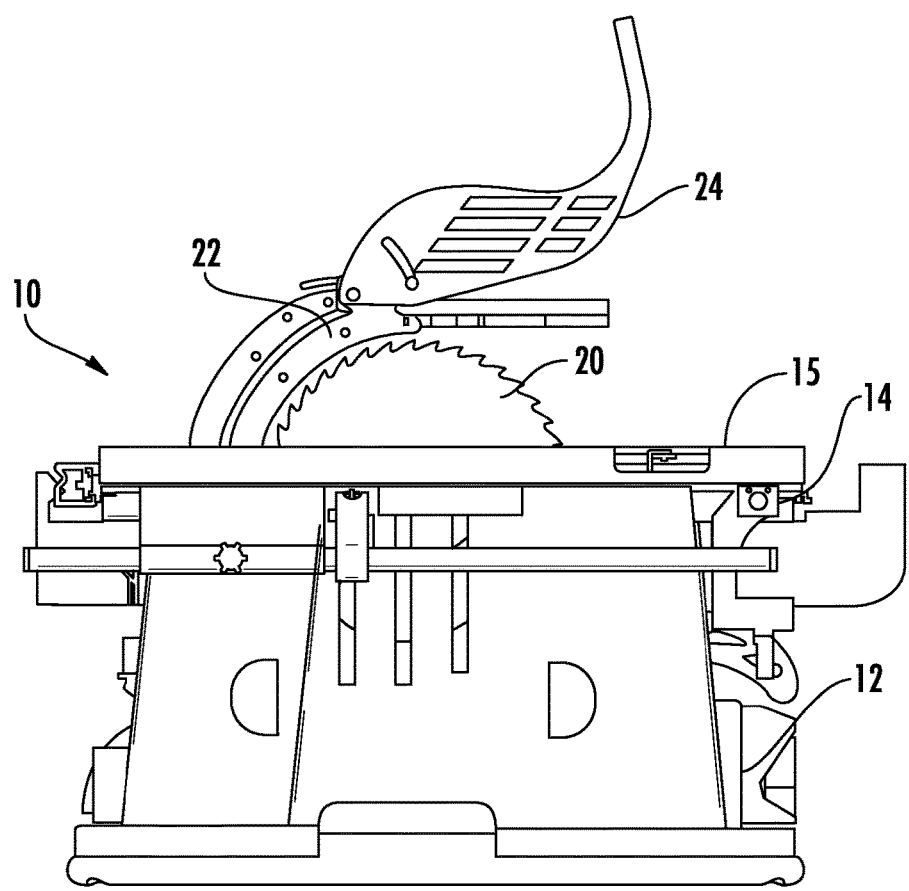
FIG. 2 is a side view of the table saw shown in FIG. 1.

A power tool, and particularly a table saw 10 is shown in FIGS. 1-2 that incorporates certain features disclosed herein. The table saw 10 includes a base 12 that is configured to be supported on a work surface and is further configured to enclose and contain the working components of the saw, as is conventional in the art. It is understood that the base 12 may be configured for portability, as shown in the figures, or may be a cabinet base that is kept in a generally fixed location. The base 12 supports a table 14 that provides the working surface 15 on which the workpiece is supported for the cutting/shaping operation. The table 14 defines a blade slot 16 for receiving a rotary saw blade 20. A riving knife assembly 22 is supported above the saw blade and a blade guard 24 may be pivotably mounted to the riving knife. The riving knife and blade guard are conventional safety features to reduce the likelihood of injury to the tool operator and to help prevent the operator from moving his/her hands into the saw blade.

Figure 3:
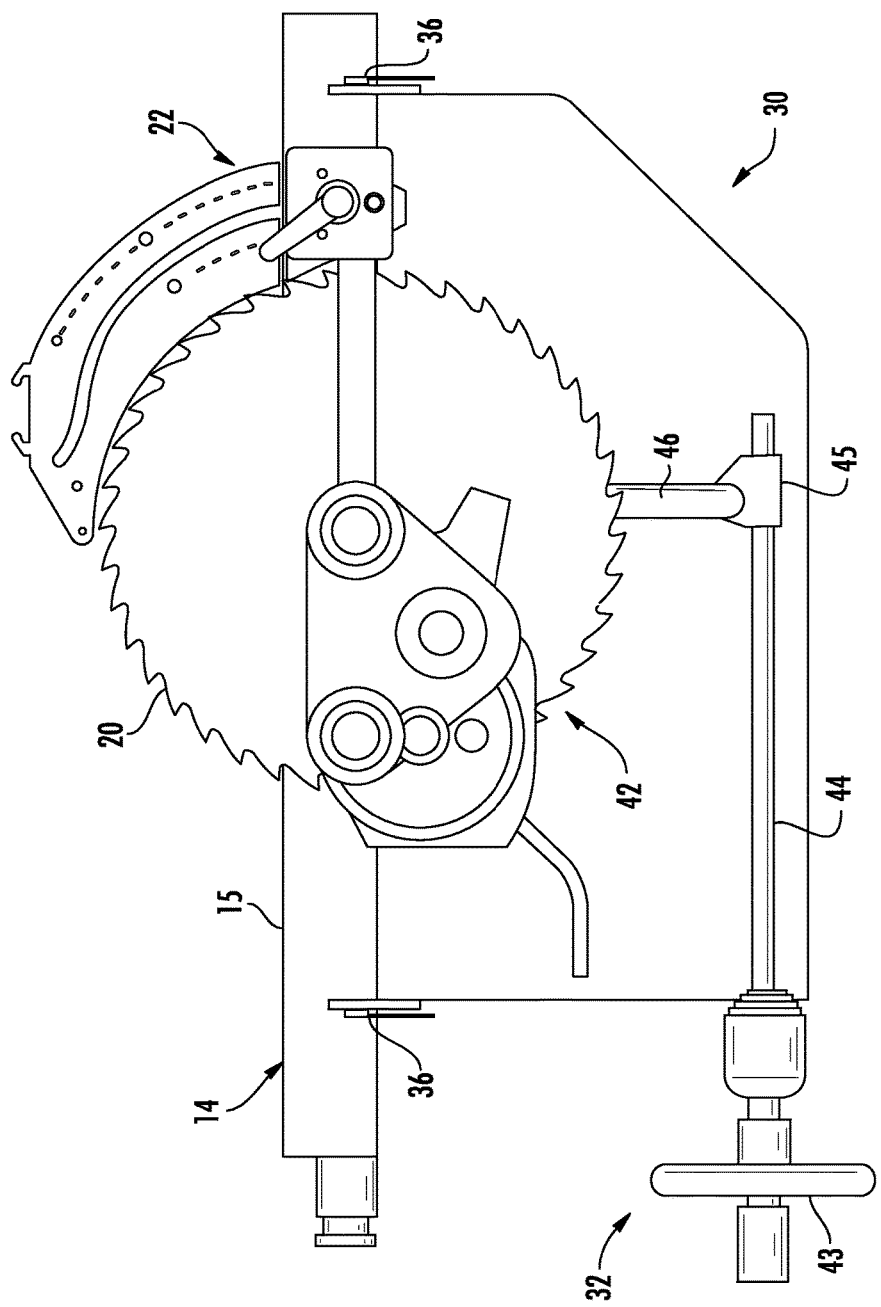
FIG. 3 is side cut-away view of the table saw shown in FIGS. 1-2 incorporating a safety mechanism and drive belt assembly according to one aspect of the disclosure, with the cutting blade in a first operating position.

A general schematic of the components of the table saw 10 is shown in FIG. 3. In particular, the table saw includes an undercarriage assembly 30 that includes an undercarriage component 34 configured to support the working components of the tool underneath the table 14. The undercarriage assembly may be supported on the table by a pair of pivot brackets 36 that allow the assembly 30 as well as the saw blade 20 to be pivoted to a desired bevel angle, as is known in the art. An elevation and bevel mechanism 32 is provided that can be used to adjust the bevel angle (or the amount of pivot about the brackets 36) as well as the height of the saw blade 20 above the surface 15 of the table. For instance, the mechanism 32 may include a hand crank 43 that can be used to rotate elevation screw 44. A nut 45 traverses the length of the elevation screw as the screw rotates. An elevation link 46 is mounted at one end to the elevation nut and at an opposite end to a drive assembly 42 that supports the saw blade. Thus, as the screw 44 is rotated in one direction the nut 45 advances toward the free end of the screw, which in turn moves the link 46 from the angled position shown in FIGS. 4-5 to the generally perpendicular position shown in FIG. 3. The elevation mechanism can thus move the saw blade from the maximum height above the work surface 15 shown in FIG. 3 to the maximum depth below the work surface shown in FIG. 5.

Figure 4:
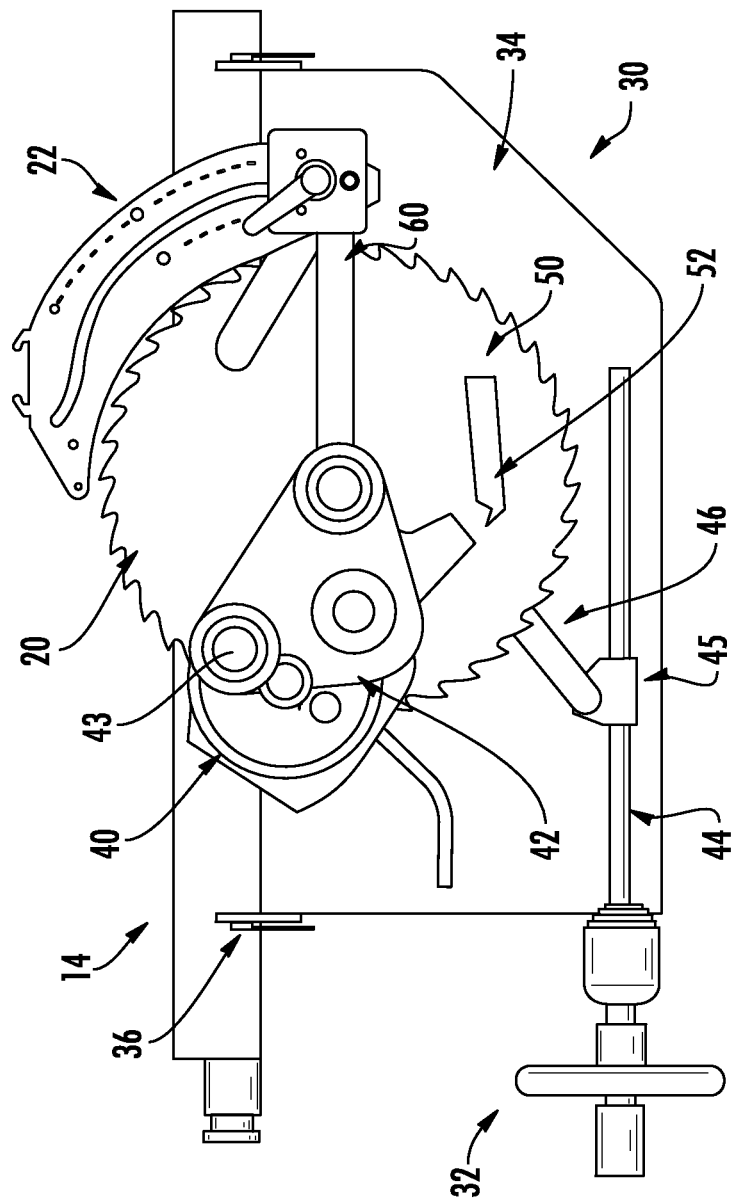
FIG. 4 is a side cut-away view of the table saw shown in FIG. 3, with the cutting blade in a second retracted position.
Figure 5:
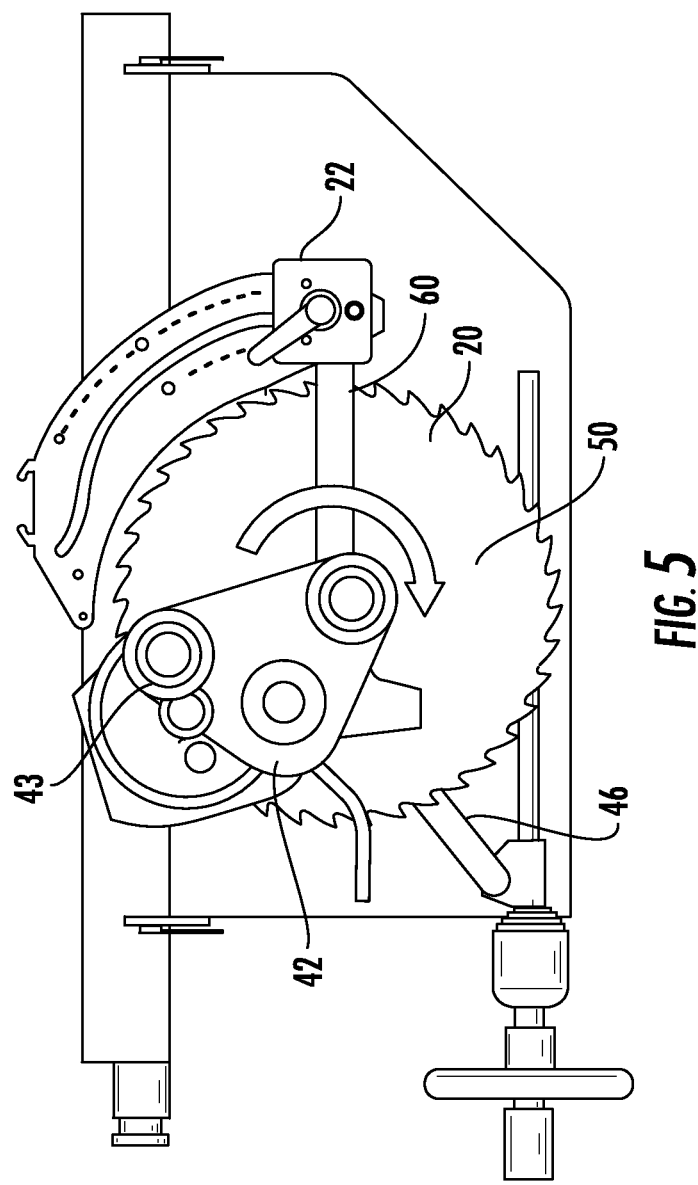
FIG. 5 is a side cut-away view of the table saw shown in FIG. 4, with the cutting blade in a further retracted position.

As further shown in FIGS. 4-5, the table saw 10 includes a belt and arm drive assembly 42 that couples the saw blade 20 to a drive motor, as described herein. In one aspect of the disclosure, the belt and arm drive assembly 42 is pivotably mounted at a pivot axis 43 to the undercarriage 34 so that the entire assembly, including the saw blade, can pivot, as depicted in FIGS. 4-5. The drive assembly 42 is connected to a riving knife linkage assembly 60 that is configured to maintain the riving knife at a consistent distance from the saw blade 20, even as the drive assembly and blade are pivoted between the maximum height and the maximum depth positions described above.

Figure 6:
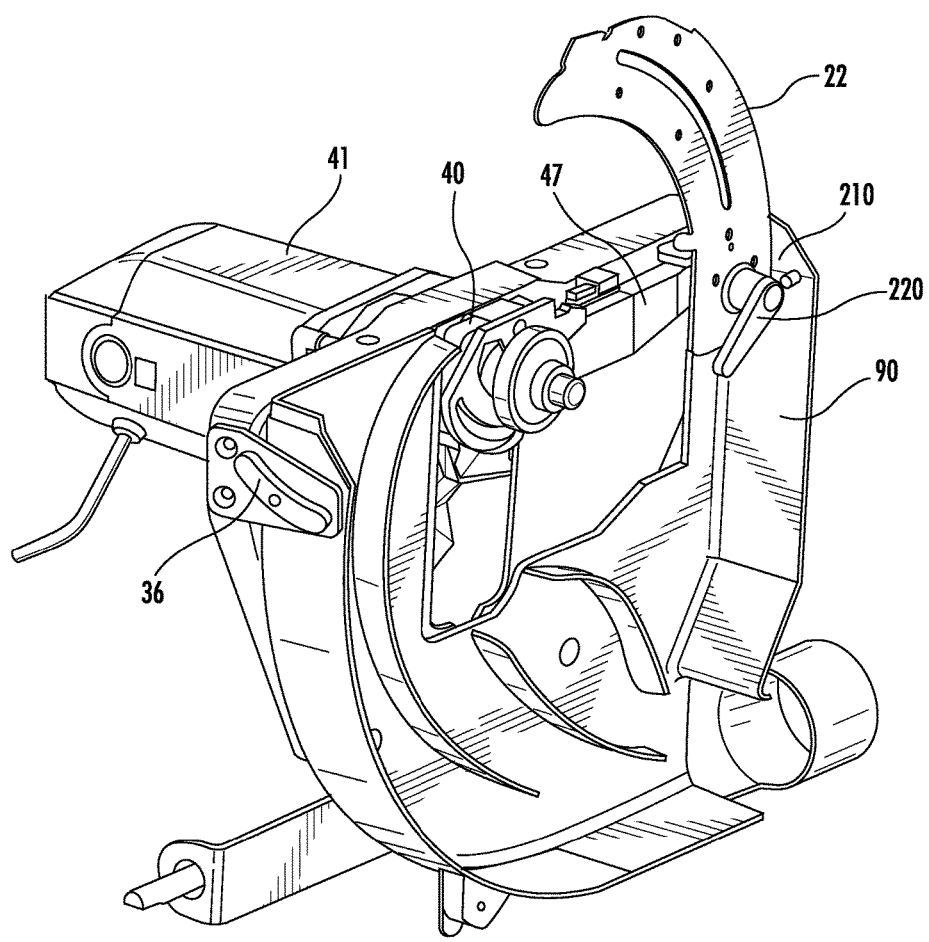
FIG. 6 is a perspective partial cut-away view of an undercarriage assembly with a riving knife assembly according to one aspect of the disclosure.
Figure 7:
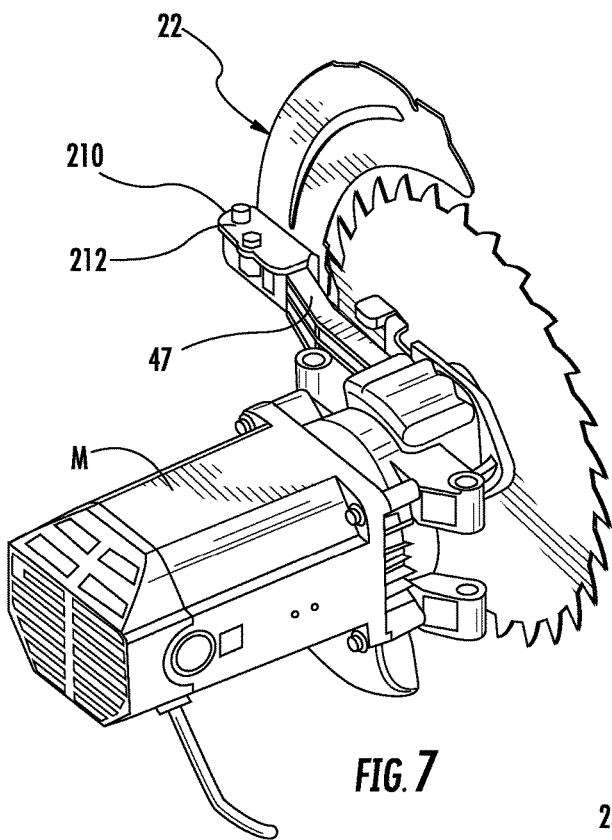
FIG. 7 is a rear perspective view of the motor assembly and riving knife assembly depicted in FIG. 6.
Figure 8:
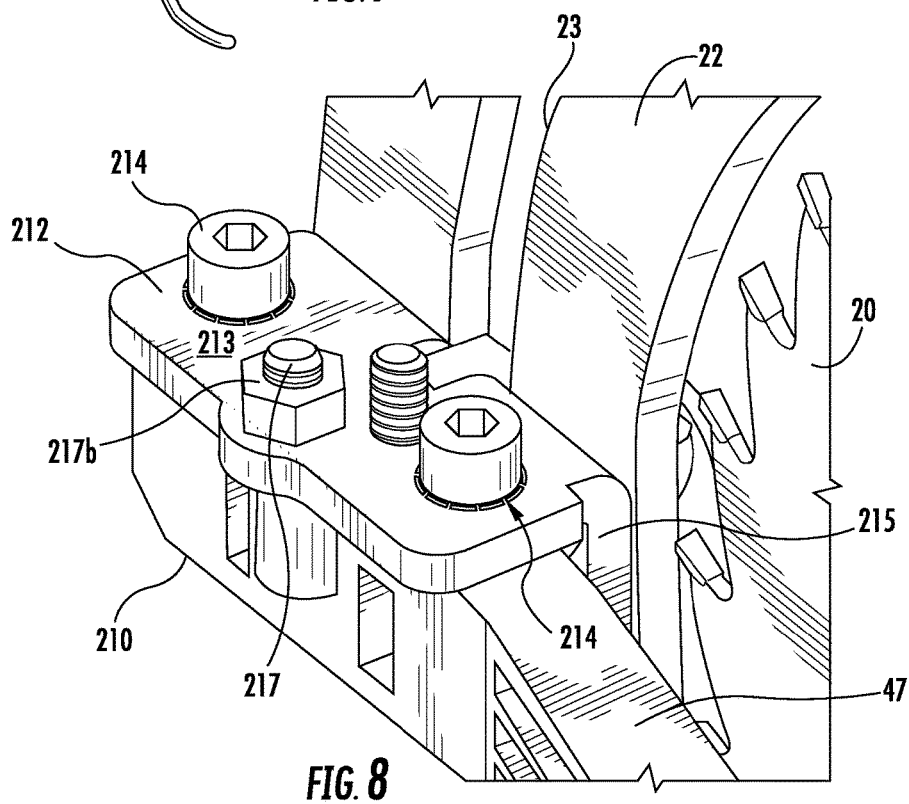
FIG. 8 is an enlarged view of the riving knife mounting assembly for the riving knife shown in FIGS. 6-7.
Figure 9:
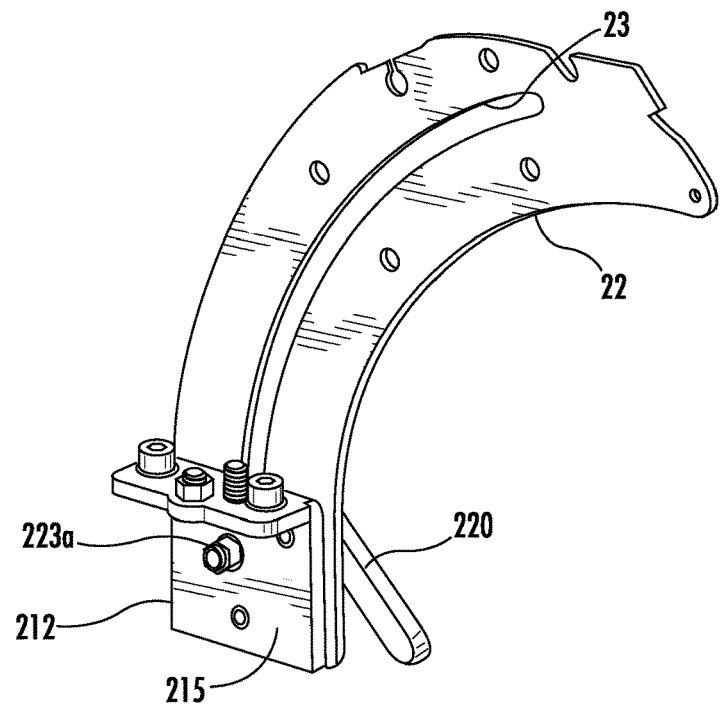
FIGS. 9 and 10 are rear and front perspective views of the riving knife with the mounting assembly engaged to the knife according to one aspect of the disclosure.
Figure 10:
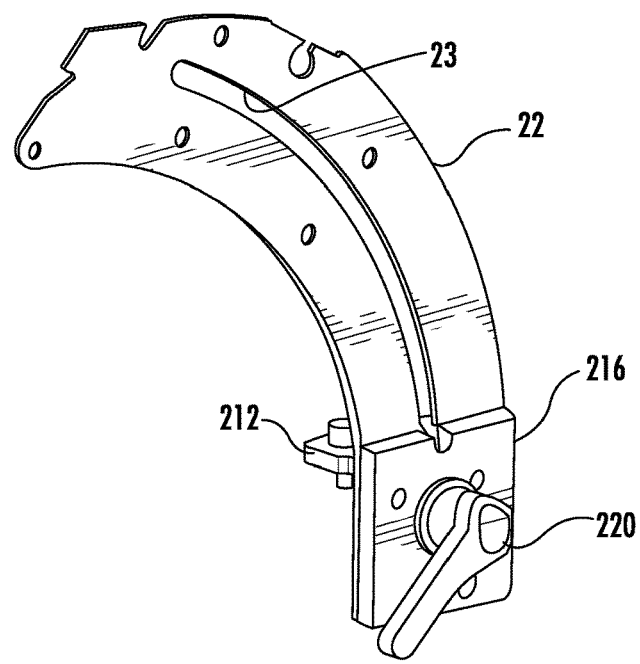

According to one aspect of the disclosure, the table saw 10 of FIGS. 1-3 may be provided with a riving knife mounting assembly 210 shown in FIGS. 6-11 that allows efficient and intuitive engagement with the riving knife to mount the riving knife to the power tool in proper alignment and spacing relative to the saw blade. As shown in FIG. 6, the motor gear train 40 extending from motor 41 may include a motor arm 47 extending parallel to the saw blade (not shown) to provide a base for mounting the riving knife 22. It is contemplated that the motor arm 47 may be part of the riving knife linkage assembly 60 described above, and in particular may constitute the horizontal link. The mounting assembly 210 is engaged to the motor arm 47 by a mounting bracket 212 and provides structure for engaging and clamping to the riving knife. A lever assembly 220 is provided within the housing 90 that allows the operator to unlock and lock the mounting assembly 210 as needed to adjust the position of the riving knife relative to the saw blade. As shown in FIG. 8, the mounting assembly includes a pair of mounting screws 214 that are threaded into corresponding bores in the motor arm 47. The mounting assembly further includes an adjustment screw 217 that is operable to adjust the alignment of the riving knife with the saw blade, and an adjustment screw 219 that is operable to adjust the gap between the riving knife and the saw blade.

Figure 11:
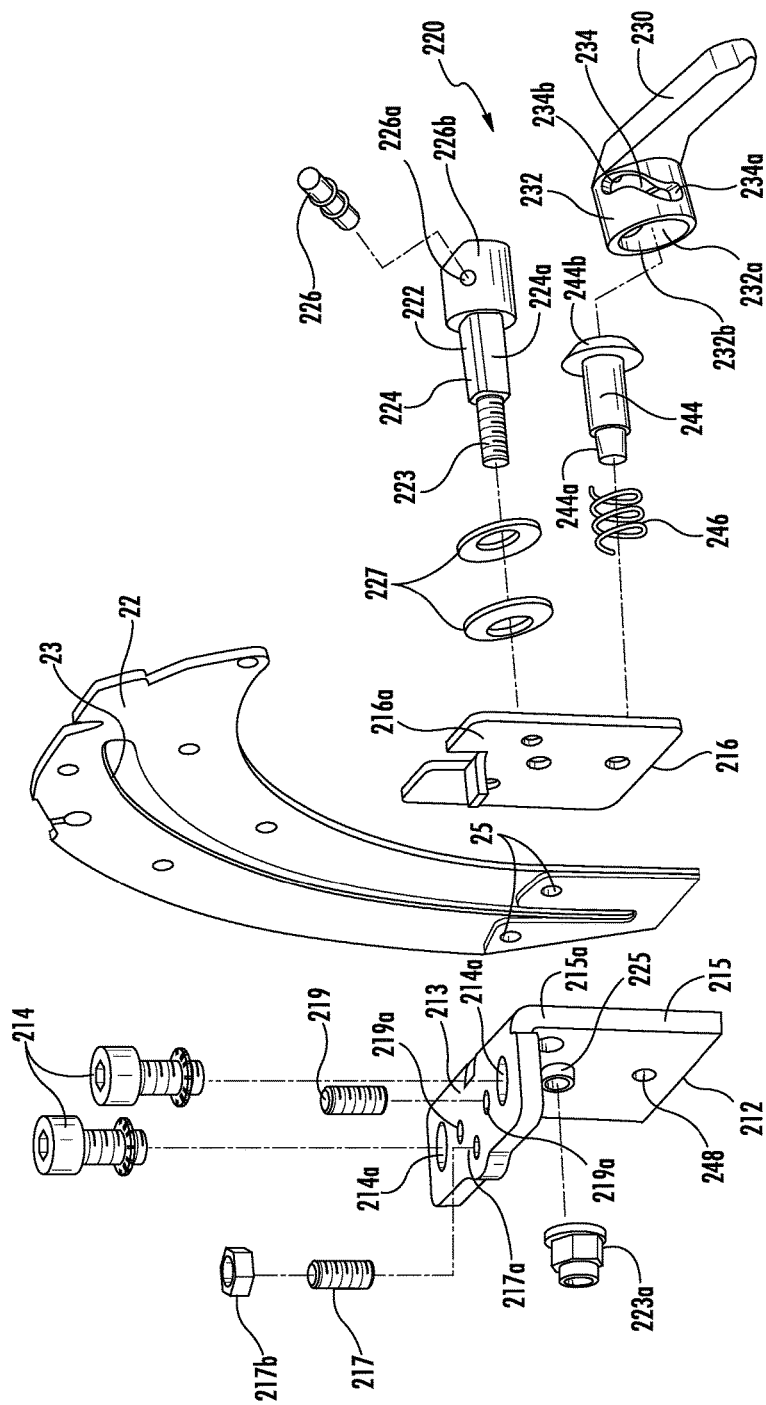
FIG. 11 is an exploded view of the riving knife and mounting assembly shown in FIGS. 9-10.
Figure 12:
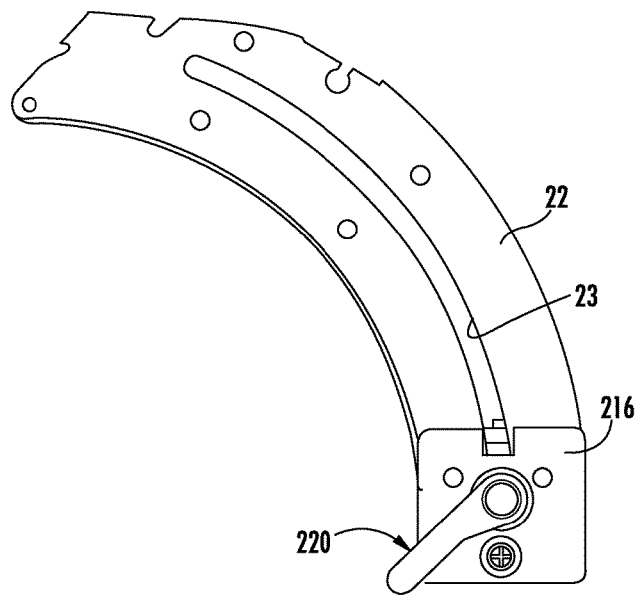
FIGS. 12-14 are front, top and side views of the riving knife and mounting assembly shown in FIGS. 9-11.
Figure 20:
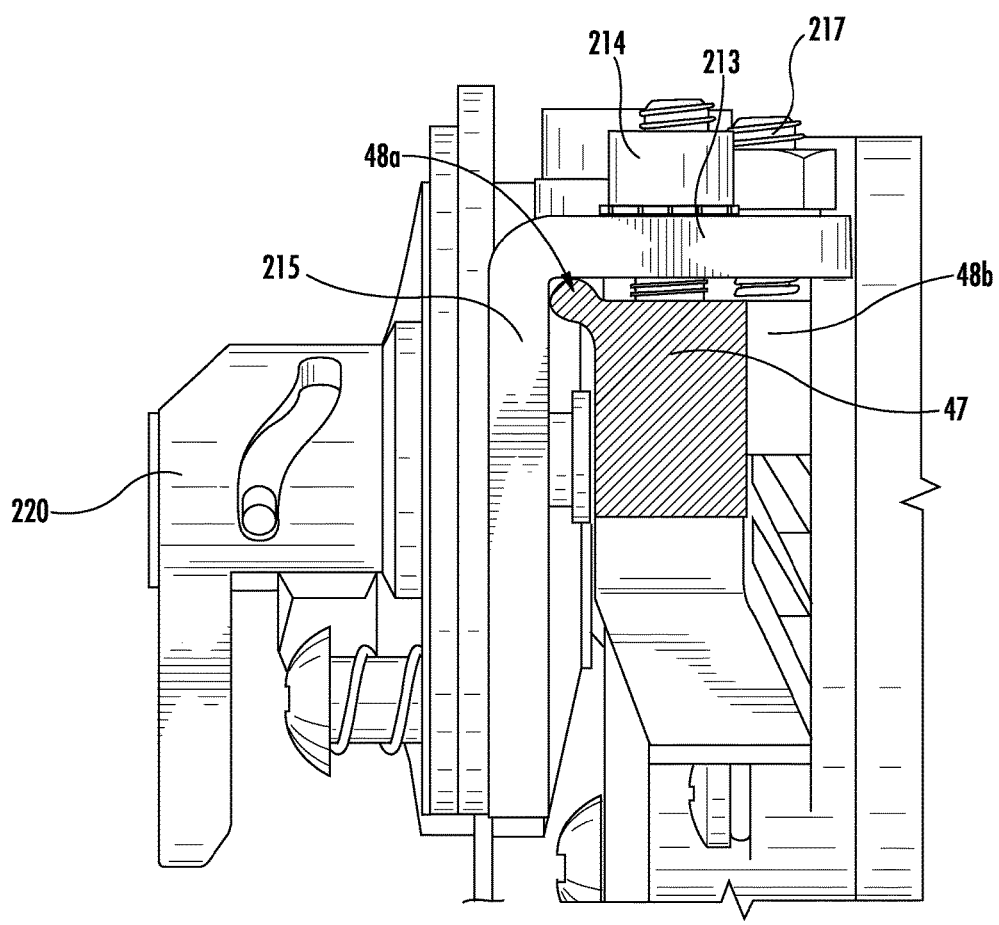
FIG. 20 is a side view showing the relative orientation of the motor arm and the mounting assembly according to the disclosure.

As best shown in the exploded view of FIG. 11, the mounting bracket 212 of the riving knife mounting assembly 210 includes a mounting plate 213 that defines slotted openings 214a to receive the mounting screws 214. The slotted openings are elongated in the lateral direction to allow the mounting bracket 212 to be adjusted laterally relative to the saw blade. The openings 214a may also be wider than the screws 214 to allow some forward-backward adjustment (i.e., parallel to the saw blade) to aid in providing a proper gap between the riving knife and the saw blade. The mounting plate 213 further defines a threaded bore 217a for receiving a threaded adjustment screw 217. The set screw 217 may bear against a rib 48a (FIG. 20) on the motor arm which allows the mounting bracket 212 to rock about the rib. The adjustment screw 217 bears against a boss 48b (FIG. 20) on the motor arm to control the angular orientation of the plate 213 on the rib 48a, and thereby accurately control the alignment of the riving knife relative to the saw blade.

Another alignment screw 219 may be provided that is threaded into one of the two threaded bores 219a in the mounting plate 213. The alignment screw 219 bears against the motor arm 47 to adjust the rocking position of the riving knife (i.e., the angular orientation in a plane parallel to the blade) to further assist in establishing a proper gap. It can be appreciated that the mounting bracket 212 is initially loosely engaged to the motor arm 47 by the mounting screws 214. With the bracket loosely supported the adjustment screws 217, 219 can be adjusted to achieve the proper orientation and spacing of the riving knife. Once the adjustment screws have been set, the mounting screws 214 can be tightened to fix the mounting assembly 110 to the motor arm 47. A locking nut 217b may be provided for the rocking movement adjustment screw 217.

Figure 13:
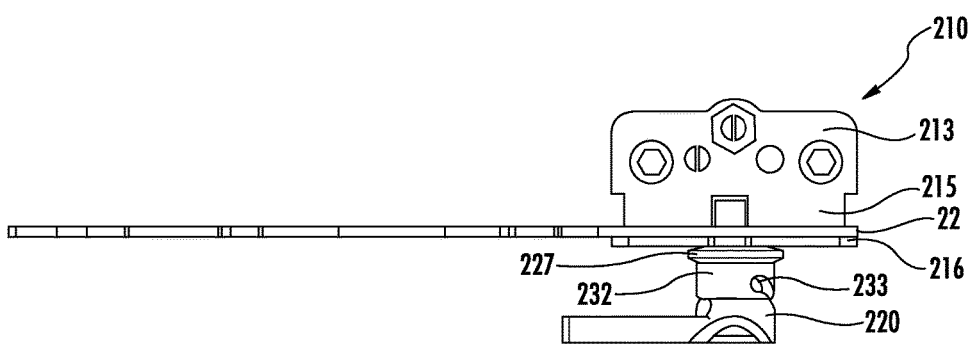
Figure 14:
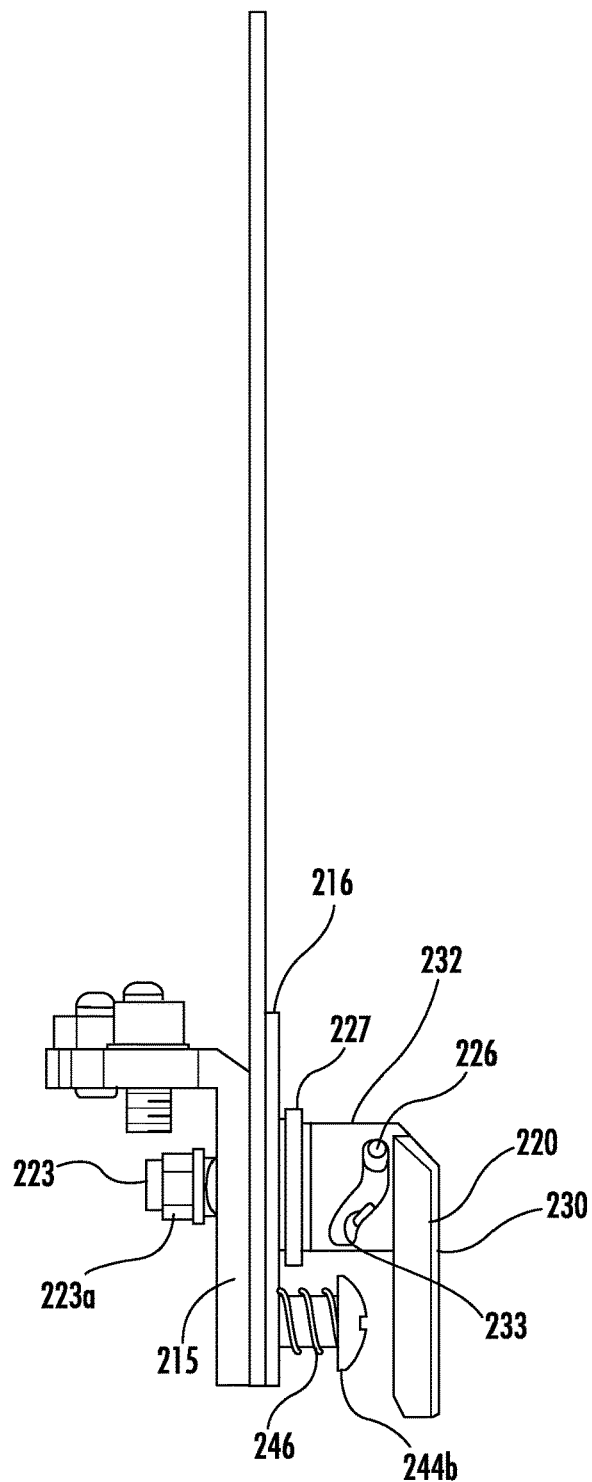
Figure 17:
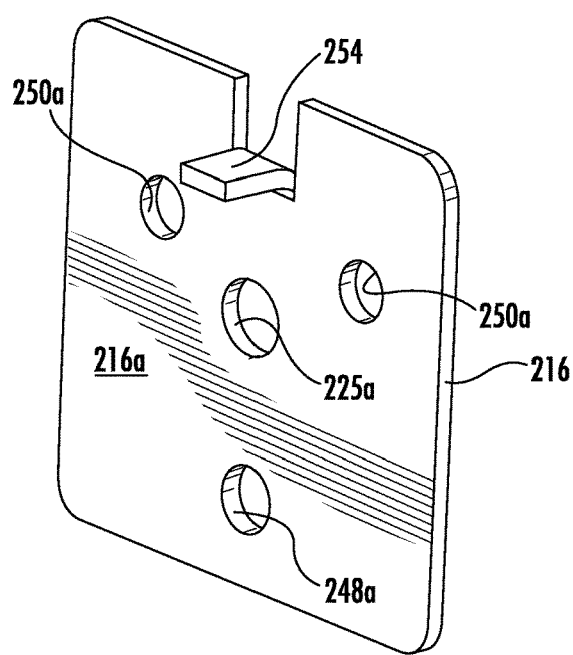
FIG. 17 is an enlarged perspective view of the locking plate for the riving knife mounting assembly depicted in the prior figures.
Figure 18:
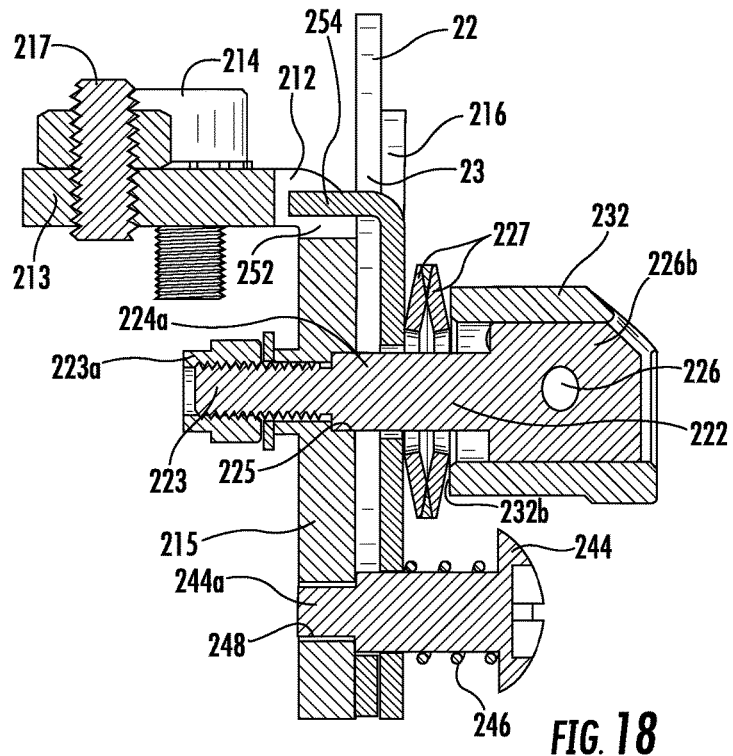
FIG. 18 is a side cross-sectional view of the mounting assembly engaged to the riving knife.
Figure 21:
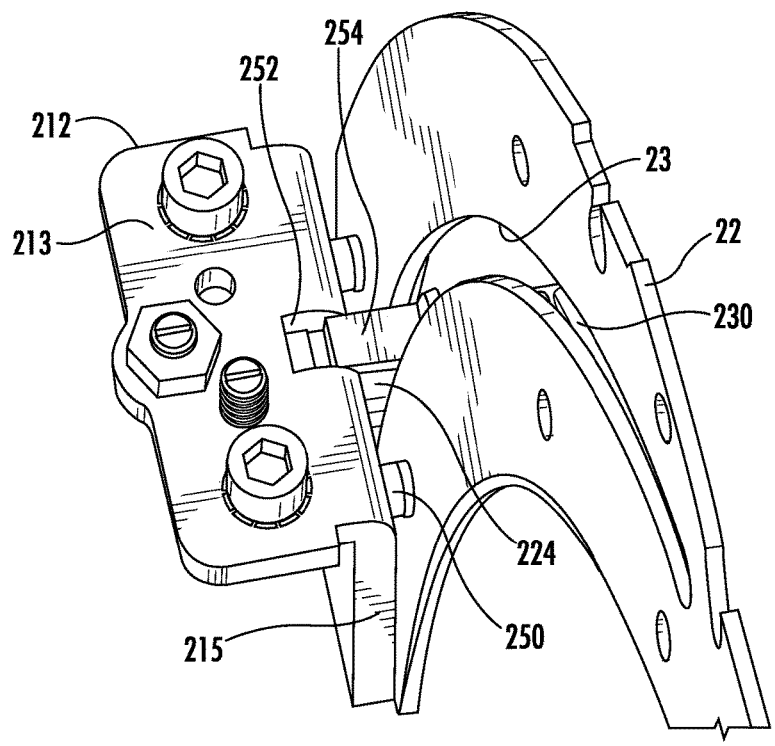
FIG. 21 is a top perspective view of the riving knife engaged to the mounting assembly disclosed herein.

As in a typical riving knife, the riving knife 22 includes an arcuate slot 23 for engagement with the mounting assembly 210 that allows adjustment of the angular position of the riving knife relative to the saw blade and to the workpiece being cut by the blade. Once the riving knife is positioned for use it is imperative that the knife be solidly locked so that it cannot come loose during operation of the power tool. The mounting assembly 210 thus includes a clamping plate 215 that is part of the mounting bracket 212 and a locking plate 216, in which the two plates are configured to sandwich the riving knife therebetween, as depicted in FIGS. 13-14. The clamping plate and locking plate include generally planar surfaces 215a, 216a facing each other that bear against opposite sides of the riving knife 22. As illustrated in the detail views of FIGS. 16-17, the clamping plate 215 defines a tab recess 252 and the locking plate 216 includes a tab 254 that extends from the plate. As best seen in FIGS. 18 and 21, the tab 254 extends through the slot 23 of the riving knife and into the recess 252 of the clamping plate. This tab-recess interface ensures proper alignment of the clamping plate 215 and locking plate 216, and provides a further alignment feature for the riving knife by the close running fit between the tab 254 and the slot 23. It can also be appreciated that the tab-recess interface helps hold the riving knife to the mounting assembly as the assembly is engaged to or adjusted relative to the motor arm 47.

The disclosure contemplates aspects of the mounting assembly 210 that facilitates and simplifies the locking and unlocking of the riving knife to the mounting assembly when the mounting assembly is fastened to the motor arm.

Figure 16:
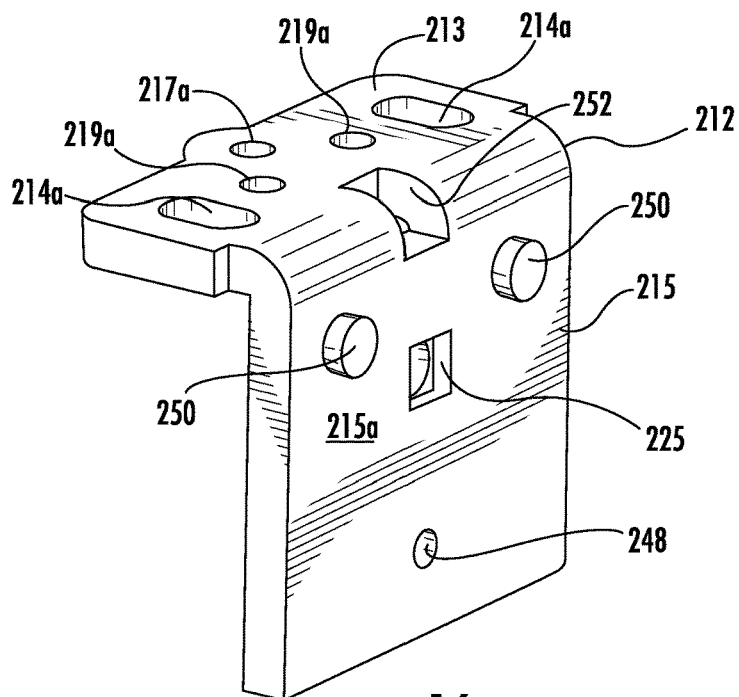
FIG. 16 is an enlarged perspective view of the mounting bracket for the riving knife mounting assembly depicted in the prior figures.

Returning to FIG. 11, the mounting assembly 210 includes a lever assembly 220 that can be manually actuated to loosen or tighten the clamping and locking plates about the riving knife. The lever assembly 220 includes a locking shaft 222 that passes through a bore in the locking plate 216 and through the slot 23 to engage the clamping plate 215. In one aspect, the locking shaft 222 includes a threaded post 223 that passes through an opening 225 in the clamping plate for engagement with a nut 223a. The locking shaft 222 further includes a keyed portion 224 having one or more flats 224a that are configured to engage complementary configured surfaces of the opening 225 in the clamping plate 215. As shown in FIG. 16, the opening 225 may be generally square to receive the keyed portion 224 and prevent relative rotation between the locking shaft and the clamping plate once the nut 223a has been tightened onto the threaded post 223.

Figure 19:
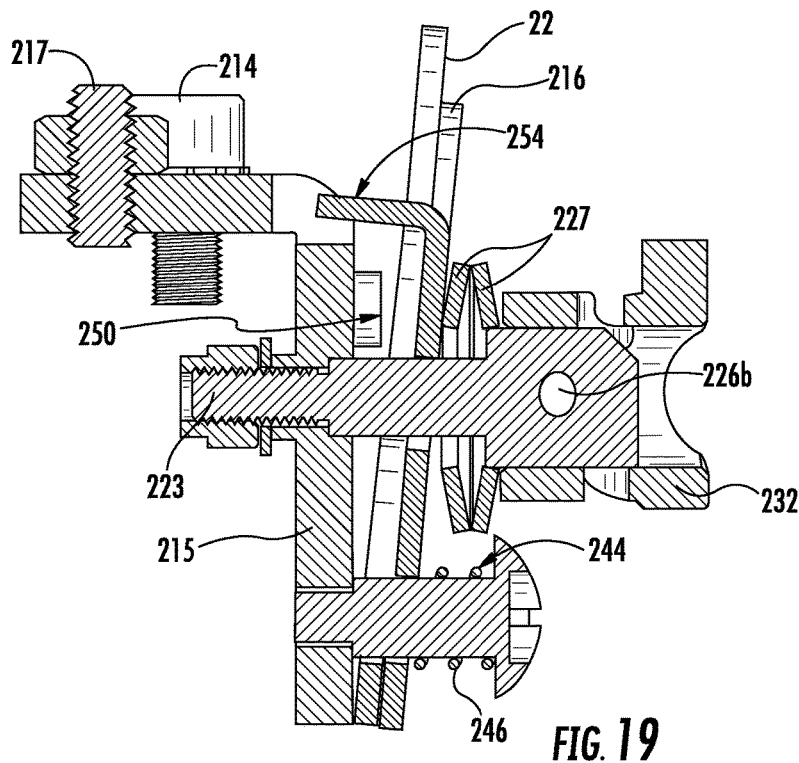
FIG. 19 is a side cross-sectional view of the mounting assembly and riving knife shown in FIG. 18, depicting disengagement of the riving knife from the mounting assembly.

Proper alignment of the riving knife to the mounting assembly may be maintained by locking bosses 250 (FIG. 16) projecting from the clamping plate 215 toward the riving knife. The riving knife 22 includes corresponding pairs of openings 25 flanking the slot 23 (FIG. 15a) that are sized to receive the locking bosses 250 when the riving knife is clamped to the mounting assembly. A plurality of the pairs of openings 25 may be provided along the length of the riving knife flanking the arcuate slot 22 corresponding to different angular positions of the riving knife relative to the saw blade. As shown in FIG. 19, the lever assembly must be in the unlocked position to allow the riving knife to disengage from the locking bosses 250. In this unlocked position, pressure is maintained on the locking plate 216 by a spring arrangement 227. In one embodiment the spring arrangement 227 includes facing bevel washers that are threaded onto the locking shaft 222. The spring arrangement 227 is held between the locking plate 216 and a hub 226b of the locking shaft. When the locking shaft is tightened by the nut 223a the hub 226b may compress the spring arrangement 227 against the locking plate 216, which in turn exerts a clamping force against the riving knife to clamp the riving knife against the clamping plate 215. When the locking shaft 222 is loosened but not disengaged, pressure on the spring arrangement is reduced allowing the riving knife to be pivoted outward against the spring arrangement 227, as illustrated in FIG. 19.

In order to provide an intuitive and easily operated clamping mechanism, the lever assembly 220 is provided with a lever 230 having a hub 232 defining a bore 232a for receiving the hub 226b of the locking shaft 222, as shown in FIG. 11. The lever hub 232 further defines an arcuate cam slot 234 that receives a cam pin 226. The cam pin 226 is fixed within a bore 226a defined in the locking shaft hub 226b. The cam pin is thus configured to ride within the cam slot 234 in the lever, or more precisely the cam pin interacts with the cam slot to translate rotation of the lever 230 to linear movement of the lever hub 232. As illustrated in FIG. 11, the arcuate slot 234 extends from an unlocked baseline portion 234a to a locked baseline portion 234b. The unlocked baseline portion 234a is positioned nearest the spring arrangement 227 while the locked baseline portion 234b is positioned farthest away from the spring arrangement with the lever 230 mounted on the locking shaft hub 226b. The two baseline portions 234a, 234b are preferably generally horizontal to provide a resting position for the cam pin 226 that cannot be dislodged except by deliberate rotation of the lever 230. The cam slot 234 thus provides an arcuate path between the two baseline portions so that rotation of the lever causes the cam slot to travel along the cam pin.

Figure 15A:
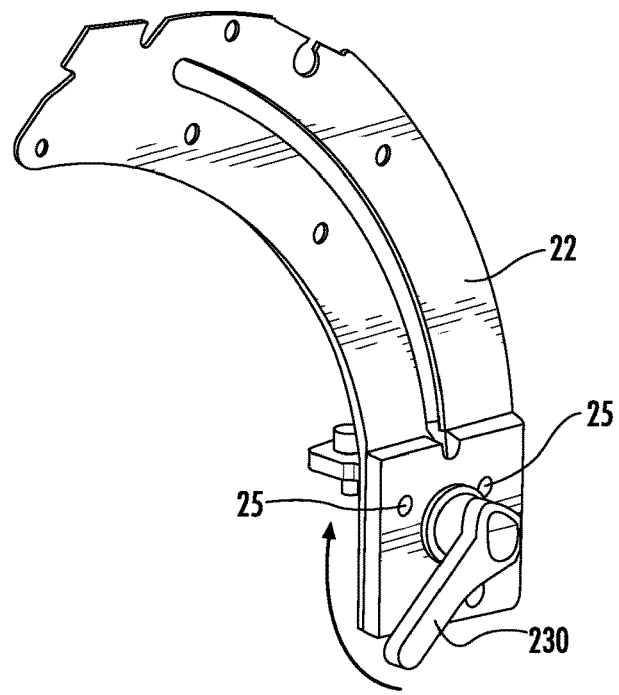
FIGS. 15a, 15b are perspective views of the riving knife and mounting assembly shown with the mounting assembly in the locked and unlocked positions, respectively.
Figure 15B:
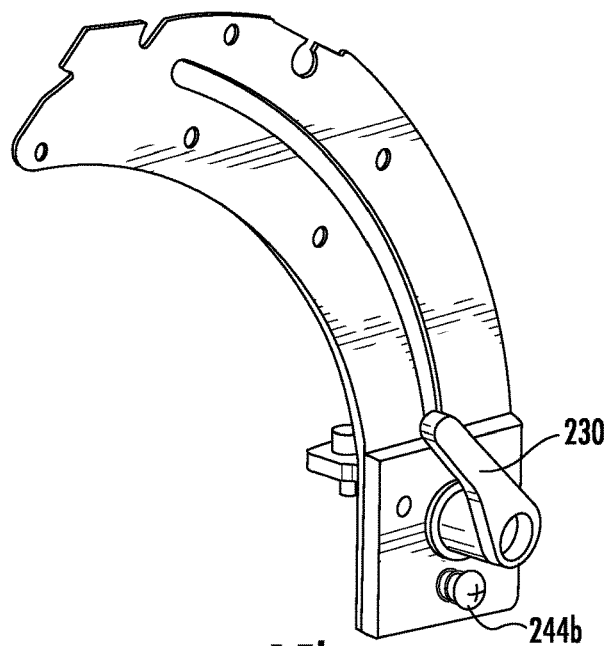

When the cam pin 226 is positioned within the locked baseline portion 234b, as illustrated in FIG. 15a, the hub 232 of the lever is at its closest position to the locking plate 216 so that the inner rim 232b of the hub exerts the maximum pressure against the spring arrangement 227. In this position the riving knife is solidly locked in position on the mounting assembly 210, as illustrated in FIG. 18. When the lever is rotated in the clockwise direction (FIG. 15a), the cam slot rotates with the lever hub 232 until the cam pin 226 is positioned within the unlocked baseline portion 234a, as illustrated in FIG. 15b. In this position, the lever hub 232 exerts a minimal pressure against the spring arrangement 227 so that the riving knife can be disengaged is desired, as depicted in FIG. 19. It can thus be appreciated that the lever assembly 220 provides an intuitive system for locking and unlocking the riving knife from the mounting assembly. Since the clamping and locking plates 215, 216 are always held together with the riving knife by the locking shaft 222, there is little opportunity for misalignment of the riving knife after the mounting adjustments have been made and it is desired to clamp the riving knife in position.

To enhance the intuitive feel for positive engagement of the riving knife to the mounting assembly, a shoulder screw 244 may be provided, as shown in FIG. 18, that passes through the riving knife slot 23 and that includes a threaded end 244a configured to engage a threaded bore 248 in the clamping plate 215. The shoulder screw retains a biasing spring 246 between the head 244b of the shoulder screw and the locking plate 216. The spring 246 maintains a continuous pressure on the locking plate 216 and thereby on the riving knife 22 toward the locking bosses 250. This constant pressure allows the operator to move the riving knife slightly side-to-side until the bosses 250 fall into the openings 25 in the riving knife. The operator thus feels the engagement and is thus assured that the riving knife is properly positioned.

Figure 22:
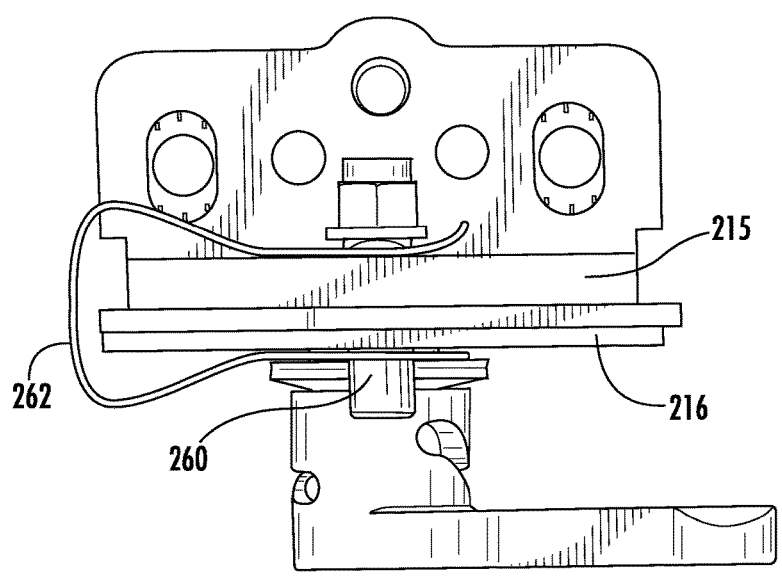
FIG. 22 is a top view of an alternative configuration to reduce riving knife play.

In one modification, a U-shaped spring 262 may be mounted to bear on the outside of the clamping plate 215 and locking plate 216 as depicted in FIG. 22. A post 260 may be provided to fix the location of the leaf spring. In the manner of a cotter pin arrangement, the spring 262 may incorporate openings to receive the post. The post may have the configuration of the shoulder screw 244 described above.

The present disclosure should be considered as illustrative and not restrictive in character. It is understood that only certain embodiments have been presented and that all changes, modifications and further applications that come within the spirit of the disclosure are desired to be protected.

What is claimed is:

1. A mounting assembly for mounting a riving knife of a table saw to a motor arm of the table saw, the riving knife having an arcuate slot extending along a length of the riving knife that allows adjustment of an angular position of the riving knife relative to a saw blade and to a workpiece being cut by the blade, the mounting assembly comprising:
   a mounting bracket mountable to the motor arm of the table saw, the mounting bracket including a clamping plate defining a clamping surface facing the riving knife;
   a locking plate defining a locking surface facing the riving knife and the clamping plate;
   a tab and recess arrangement defined by the mounting bracket and the locking plate, the locking plate including a plurality of peripheral edges, at least one of the peripheral edges interrupted by a vertical slot having a single monolithic tab projecting substantially perpendicular relative to the locking surface, the single tab sized to extend through and in a running fit with the arcuate slot of the riving knife, and the clamping plate including a recess sized to receive the tab when the tab extends through the arcuate slot; and
   a lever assembly engaged between the mounting bracket and locking plate and operable to press the mounting bracket and locking plate together about the riving knife to clamp the riving knife between the clamping surface and the locking surface, the lever assembly including;
      an elongated locking shaft extending through shaft openings in the mounting bracket and the locking plate, the locking shaft configured to extend through the arcuate slot in the riving knife;
      one end of the locking shaft fastened to the clamping plate;
      an opposite end of the locking shaft including a lever hub rotatably mounted thereon, the lever hub including a manually engagable lever for rotating the lever hub relative to the locking shaft;
      a spring arrangement mounted on the locking shaft between the lever hub and the locking plate; and
      a cam arrangement between the locking shaft and the lever hub operable to pull the locking shaft toward the lever hub upon rotation of the lever hub, to thereby pull the clamping plate toward the locking plate against a force of the spring arrangement to thereby clamp the riving knife between the clamping surface and locking surface.

2. The mounting assembly of claim 1, wherein the spring arrangement includes at least one bevel washer.

3. The mounting assembly of claim 2, wherein the spring arrangement includes two bevel washers opposing each other.

4. The mounting assembly of claim 1, wherein:
   the lever hub defines a bore therethrough and an arcuate cam slot in communication with the bore;
   the locking shaft includes a shaft hub at the opposite end, the shaft hub received within the bore of the lever hub and sized to permit rotation of the lever hub relative to the shaft hub, the shaft hub including a pin projecting from the shaft hub and into the arcuate cam slot;
   the cam slot configured to move the pin toward or away from the clamping plate upon rotation of the lever hub.

5. The mounting assembly of claim 1 in which the riving knife includes at least one pair of openings therethrough flanking the arcuate slot, wherein:
   one of the clamping plate and the locking plate includes a pair of bosses corresponding to the pair of openings in the riving knife; and
   the other of the clamping plate and the locking plate includes a pair of openings corresponding to the pair of bosses, the bosses sized to extend through the pair of openings in the riving knife and the pair of openings in the other of the clamping plate and the locking plate only when the riving knife is clamped between the clamping plate and locking plate.

6. The mounting assembly of claim 1, wherein:
   the locking shaft includes a keyed portion extending through the shaft opening in the clamping plate; and
   the shaft opening of the clamping plate is complementary configured to the keyed portion to prevent rotation of the locking shaft relative to the clamping plate.

7. The mounting assembly of claim 1, wherein the mounting bracket includes a mounting plate defining at least one fastener opening to receive a fastener for engaging the motor arm of the table saw, the clamping plate extending perpendicularly from the mounting plate.

8. The mounting assembly of claim 7, wherein the mounting plate includes two fastener openings that are elongated in a direction perpendicular to the clamping plate to permit adjustment of a position of the clamping plate relative to the motor arm when the mounting bracket is engaged to the motor arm.

9. The mounting assembly of claim 7, wherein the mounting bracket includes at least one adjustment screw extending through a threaded adjustment opening in the mounting plate and arranged to bear on the motor arm when the mounting plate is engaged to the motor arm to adjust a position of the mounting bracket relative to the motor arm.

10. The mounting assembly of claim 1, further comprising:
   a shoulder screw extending through the locking plate, through the arcuate slot in the riving knife and fastened to the clamping plate at a position below the elongated locking shaft relative to the length of the riving knife, the shoulder screw having a head at one end and a threaded end fastened to the clamping plate; and
   a spring disposed between the head and the locking plate applying a spring force between the clamping plate and locking plate, the spring sized and configured to only apply a spring force that is insufficient to clamp the riving knife between the clamping plate and the locking plate.

11. The mounting assembly of claim 10 in which the riving knife includes at least one pair of openings therethrough flanking the arcuate slot, wherein:
   one of the clamping plate and the locking plate includes a pair of bosses corresponding to the pair of openings in the riving knife; and
   the other of the clamping plate and the locking plate includes a pair of openings corresponding to the pair of bosses, the bosses sized to extend through the pair of openings in the riving knife and the pair of openings in the other of the clamping plate and the locking plate only when the riving knife is clamped between the clamping plate and locking plate.

12. The mounting assembly of claim 1, further comprising:
   a U-shaped spring engaging the clamping plate and the locking plate at a position below the elongated locking shaft relative to the length of the riving knife to sandwich the riving knife between the clamping plate and the locking plate, the spring sized and configured to only apply a spring force that is insufficient to clamp the riving knife between the clamping plate and the locking plate.

13. A riving knife assembly for a table saw having motor-driven saw blade supported on a motor arm, comprising:
   a riving knife having an arcuate slot extending along a length of the riving knife that allows adjustment of an angular position of the riving knife relative to a saw blade and to a workpiece being cut by the blade; and
   a mounting assembly for mounting the riving knife to the motor arm including;
      a mounting bracket mountable to the motor arm of the table saw, the mounting bracket including a clamping plate defining a clamping surface facing the riving knife;
      a locking plate defining a locking surface facing the riving knife and the clamping plate;
      a tab and recess arrangement defined by the mounting bracket and the locking plate, the locking plate including a plurality of peripheral edges, at least one of the peripheral edges interrupted by a vertical slot having a single monolithic tab projecting substantially perpendicular relative to the locking surface, the single tab sized to extend through and in a running fit with the arcuate slot of the riving knife, and the clamping plate including a recess sized to receive the tab when the tab extends through the arcuate slot; and
      a lever assembly engaged between the mounting bracket and locking plate and operable to press the mounting bracket and locking plate together about the riving knife to clamp the riving knife between the clamping surface and the locking surface, the lever assembly including;
         an elongated locking shaft extending through shaft openings in the mounting bracket and the locking plate, the locking shaft configured to extend through the arcuate slot in the riving knife;
         one end of the locking shaft fastened to the clamping plate;
         an opposite end of the locking shaft including a lever hub rotatably mounted thereon, the lever hub including a manually engagable lever for rotating the lever hub relative to the locking shaft;
         a spring arrangement mounted on the locking shaft between the lever hub and the locking plate; and
         a cam arrangement between the locking shaft and the lever hub operable to pull the locking shaft toward the lever hub upon rotation of the lever hub, to thereby pull the clamping plate toward the locking plate against a force of the spring arrangement to thereby clamp the riving knife between the clamping surface and locking surface.

14. The mounting assembly of claim 13, wherein the spring arrangement includes two bevel washers opposing each other.

15. The mounting assembly of claim 13, wherein:
   the lever hub defines a bore therethrough and an arcuate cam slot in communication with the bore;
   the locking shaft includes a shaft hub at the opposite end, the shaft hub received within the bore of the lever hub and sized to permit rotation of the lever hub relative to the shaft hub, the shaft hub including a pin projecting from the shaft hub and into the arcuate cam slot;
   the cam slot configured to move the pin toward or away from the clamping plate upon rotation of the lever hub.

16. The mounting assembly of claim 13, wherein:
   the riving knife includes at least one pair of openings therethrough flanking the arcuate slot;
   one of the clamping plate and the locking plate includes a pair of bosses corresponding to the pair of openings in the riving knife; and
   the other of the clamping plate and the locking plate includes a pair of openings corresponding to the pair of bosses, the bosses sized to extend through the pair of openings in the riving knife and the pair of openings in the other of the clamping plate and the locking plate only when the riving knife is clamped between the clamping plate and locking plate.

17. The mounting assembly of claim 13, wherein:
   the locking shaft includes a keyed portion extending through the shaft opening in the clamping plate; and
   the shaft opening of the clamping plate is complementary configured to the keyed portion to prevent rotation of the locking shaft relative to the clamping plate.

18. The mounting assembly of claim 13, wherein the mounting bracket includes a mounting plate defining at least one fastener opening to receive a fastener for engaging the motor arm of the table saw, the clamping plate extending perpendicularly from the mounting plate.

19. The mounting assembly of claim 13, wherein:
   the riving knife includes at least one pair of openings therethrough flanking the arcuate slot;
   one of the clamping plate and the locking plate includes a pair of bosses corresponding to the pair of openings in the riving knife; and
   the other of the clamping plate and the locking plate includes a pair of openings corresponding to the pair of bosses, the bosses sized to extend through the pair of openings in the riving knife and the pair of openings in the other of the clamping plate and the locking plate only when the riving knife is clamped between the clamping plate and locking plate.

20. The mounting assembly of claim 13, further comprising:
   a U-shaped spring engaging the clamping plate and the locking plate at a position below the elongated locking shaft relative to the length of the riving knife to sandwich the riving knife between the clamping plate and the locking plate, the spring sized and configured to only apply a spring force that is insufficient to clamp the riving knife between the clamping plate and the locking plate.

* * * * *